US 9,164,567 B2

(12) United States Patent
Miller et al.

(10) Patent No.: US 9,164,567 B2
(45) Date of Patent: *Oct. 20, 2015

(54) CENTRALIZED SERVICE FOR AWAKENING A COMPUTING DEVICE

(75) Inventors: Gregory S. Miller, Sammamish, WA (US); Adam B. Glass, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 197 days.

This patent is subject to a terminal disclaimer.

(21) Appl. No.: 12/955,252

(22) Filed: Nov. 29, 2010

(65) Prior Publication Data

US 2011/0072288 A1 Mar. 24, 2011

Related U.S. Application Data

(63) Continuation of application No. 11/710,708, filed on Feb. 26, 2007, now Pat. No. 7,870,403.

(51) Int. Cl.
G06F 1/32 (2006.01)
H04L 12/66 (2006.01)
H04L 29/08 (2006.01)

(52) U.S. Cl.
CPC .............. G06F 1/3209 (2013.01); H04L 12/66 (2013.01); H04L 67/24 (2013.01); H04L 67/28 (2013.01); H04L 67/2861 (2013.01); Y02B 60/46 (2013.01)

(58) Field of Classification Search
CPC .................................................. G06F 1/3209
USPC .......................................................... 713/323
See application file for complete search history.

(56) References Cited

U.S. PATENT DOCUMENTS

| 5,446,904 A | 8/1995 | Belt et al. |
| 5,938,771 A | 8/1999 | Williams et al. |
| 5,978,911 A | 11/1999 | Knox et al. |
| 6,049,885 A | 4/2000 | Gibson et al. |
| 6,052,779 A | 4/2000 | Jackson et al. |
| 6,101,608 A | 8/2000 | Schmidt et al. |

(Continued)

FOREIGN PATENT DOCUMENTS

JP 2000165419 A * 6/2000

OTHER PUBLICATIONS

"EP Search Report", mailed Mar. 18, 2010, Application No. EP 08 714042, filed date Jan. 28, 2008, pp. 1-5.
Qiao, et al., "Smart power-saving mode for IEEE 802.11 wireless LANs", Date: 2005, http://ieeexplore.ieee.org/xpl/freeabs_all.jsp?arnumber=1498440.

(Continued)

Primary Examiner — Kim Huynh
Assistant Examiner — Eric Chang
(74) Attorney, Agent, or Firm — John Jardine; Judy Yee; Micky Minhas

(57) ABSTRACT

Various technologies and techniques are disclosed for providing and interacting with a centralized wake service. A server-side wake service is provided that is operable to allow applications to subscribe to the wake service. The wake service receives a wake request directed to a particular computing device from a particular one of the applications. The wake request is forwarded from the wake service to a client-side communication service on the particular computing device if forwarding is determined to be appropriate. When the client-side communication service on the particular computing device receives the wake request while in a reduced power mode, the computing device wakes up and an appropriate response is determined.

20 Claims, 8 Drawing Sheets

(56) References Cited

U.S. PATENT DOCUMENTS

| | | | | |
|---|---|---|---|---|
| 6,131,167 | A | * | 10/2000 | Cruz ............................. 713/320 |
| 6,134,584 | A | | 10/2000 | Chang et al. |
| 6,138,160 | A | | 10/2000 | Boies et al. |
| 6,366,957 | B1 | | 4/2002 | Na |
| 6,493,824 | B1 | | 12/2002 | Novoa et al. |
| 6,526,507 | B1 | | 2/2003 | Cromer et al. |
| 6,591,368 | B1 | | 7/2003 | Ryu |
| 6,606,709 | B1 | | 8/2003 | Connery et al. |
| 6,631,469 | B1 | | 10/2003 | Silvester |
| 6,785,724 | B1 | | 8/2004 | Drainville et al. |
| 6,892,225 | B1 | * | 5/2005 | Tu et al. ....................... 709/217 |
| 6,990,515 | B2 | | 1/2006 | Cromer et al. |
| 7,103,785 | B2 | | 9/2006 | Green et al. |
| 7,107,442 | B2 | | 9/2006 | Cheshire |
| 7,133,374 | B2 | | 11/2006 | Lo et al. |
| 7,571,332 | B2 | | 8/2009 | Cromer et al. |
| 7,870,403 | B2 | * | 1/2011 | Miller et al. .................. 713/320 |
| 7,895,309 | B2 | * | 2/2011 | Belali et al. .................... 709/223 |
| 8,161,301 | B2 | * | 4/2012 | Lim et al. ...................... 713/310 |
| 2003/0117969 | A1 | | 6/2003 | Koo et al. |
| 2003/0198196 | A1 | | 10/2003 | Bahl et al. |
| 2004/0128310 | A1 | | 7/2004 | Zmudzinski et al. |
| 2005/0047357 | A1 | | 3/2005 | Benveniste |
| 2005/0160162 | A1 | * | 7/2005 | Cromer et al. ................. 709/223 |
| 2006/0050686 | A1 | | 3/2006 | Velez-Rivera et al. |
| 2006/0087993 | A1 | | 4/2006 | Sengupta et al. |
| 2007/0067445 | A1 | * | 3/2007 | Vugenfirer et al. ........... 709/224 |

OTHER PUBLICATIONS

Mishra, et al., "Wake-on-WLAN", Date: May 23-26, 2006, http://delivery.acm.org/10.1145/1140000/1135893/p761-mishra.pdf?key1 =1135893&-key2=1835555611 &coll=GUIDE&dl= GUIDE&CFID=6376948&CFTOKEN= 17430153.

Sengul, et al., "TITAN: On-Demand Topology Management in Ad Hoc Networks", vol. 9, No. 1, Jan. 2005 http://delivery.acm.org/10.1145/1060000/1055972/p77-sengul.pdf?key1=1055972&key2= 6658645611 &coll=ACM&dl=ACM&CFID=75919783& CFTOKEN=92791909.

International Search Report and Written Opinion for PCT Patent Application No. PCT/US2008/052155, Mailed on May 30, 2008, 11 Pages.

"China Notice of First Office Action", Application No. 200880006009.6, Mailed Date: Nov. 4, 2010, pp. 15.

"China Notice of Second Office Action", Application No. 200880006009.6, Mailed Date : Jun. 9, 2011, pp. 9.

"China Notice of Third Office Action", Application No. 200880006009.6, Mailed Date : Mar. 20, 2012, pp. 6.

"European Office Action", Application No. 08714042.2-1525, Mailed Date : Dec. 13, 2011, pp. 5.

"European Office Action", Application No. 08714042.2-1525, Mailed Date : Feb. 8, 2013, pp. 6.

"European Office Action", Application No. 08714042.2-1525, Mailed Date : Feb. 28, 2014, pp. 6.

Zheng, et al.; "Power management and power control in wireless Networks"; 2004; 25 pages.

* cited by examiner

CENTRALIZED SERVICE FOR AWAKENING A COMPUTING DEVICE

This application is a continuation application of co-pending U.S. patent application Ser. No. 11/710,708 filed in the U.S. Patent and Trademark Office on Feb. 26, 2007.

BACKGROUND

Computing devices of today have various power mode settings that control when various subsets of the device turn off to conserve power. Laptops typically find these power mode settings to be most helpful, so battery life can be preserved when the computing device is not in use.

More and more services are being designed to follow the user around and communicate with the user wherever they may be. Email, instant messaging, voice-over-IP and other such network services are just a few examples of such services. However, today's world of "always-on" and "always-available" comes into direct conflict with the idea of a reduced power mode that is available on most computing devices. In other words, once the computer enters the reduced power mode, many network services can no longer communicate with the user to achieve the desired goal.

SUMMARY

Various technologies and techniques are disclosed for providing and interacting with a centralized wake service. A server-side wake service is provided that is operable to allow applications to subscribe to the wake service. The wake service receives a wake request directed to a particular computing device from a particular one of the applications. The wake request is forwarded from the wake service to a client-side communication service on the particular computing device if forwarding is determined to be appropriate. In one implementation, various settings, such as power information, user contact preferences, and user presence information that were provided by the client-side communication service are used to determine whether forwarding is appropriate.

When the client-side communication service on the particular computing device receives the wake request while in a reduced power mode, the computing device wakes up and an appropriate response is determined. In one implementation, an appropriate response includes responding to the wake service to acknowledge the request, and then pursuit of communications with the particular application that requested the wake.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
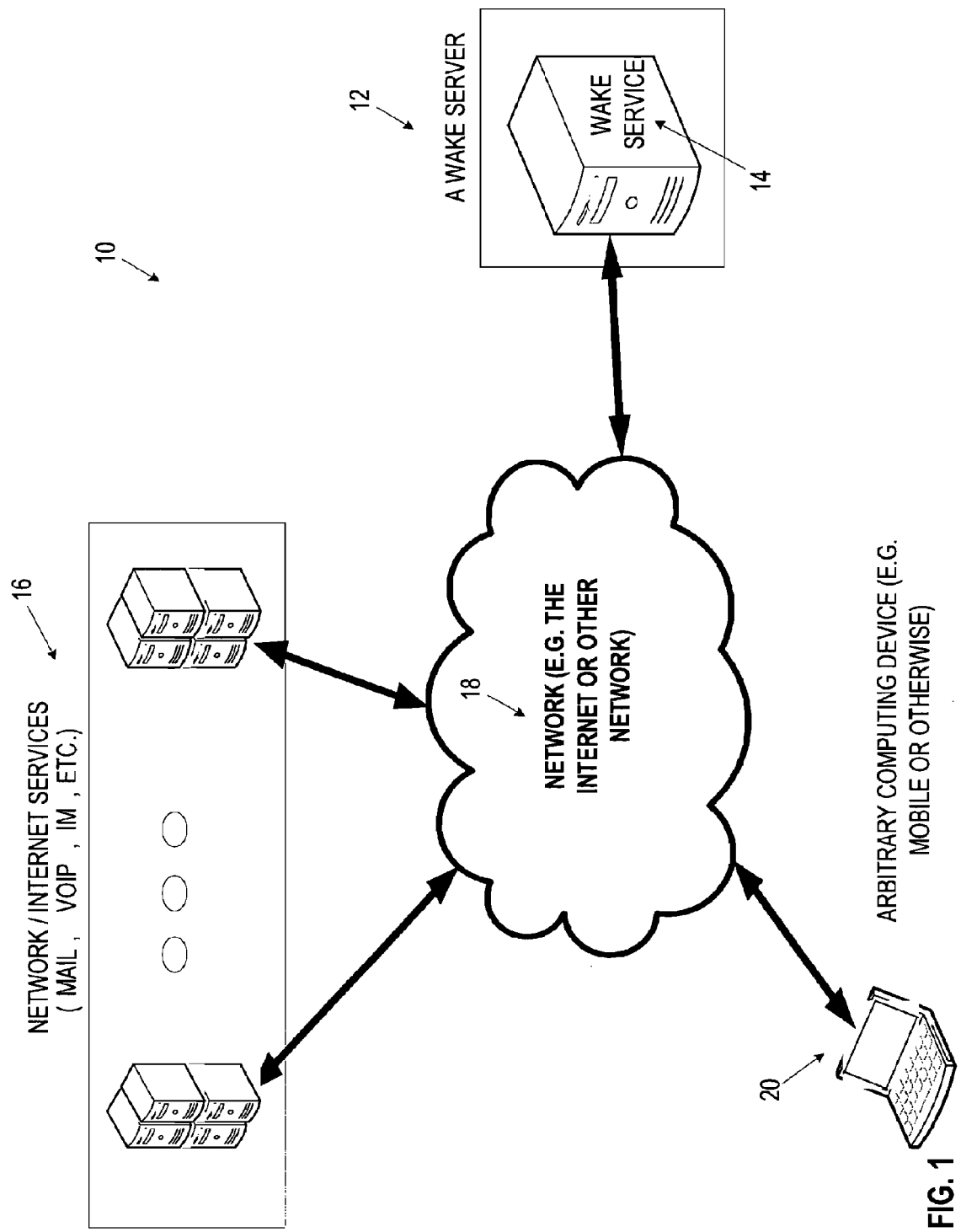
FIG. 1 is a diagrammatic view of a computer system using a centralized wake service of one implementation.

For the purposes of promoting an understanding of the principles of the invention, reference will now be made to the embodiments illustrated in the drawings and specific language will be used to describe the same. It will nevertheless be understood that no limitation of the scope is thereby intended. Any alterations and further modifications in the described embodiments, and any further applications of the principles as described herein are contemplated as would normally occur to one skilled in the art.

The system may be described in the general context as an application that wakes computing devices from reduced power modes, but the system also serves other purposes in addition to these. In one implementation, one or more of the techniques described herein can be implemented as features within a server-side wake service, a client-side communication service, and/or from any other type of program or service that manages communications between applications over a network.

In one implementation, a centralized wake service is provided that allows computing devices to be awakened when they are in a reduced power mode by network applications. For example, a voice-over-IP communication application may contact the wake service when it wishes to communicate with a particular computing device. The wake service uses information about the particular computing device to communicate with that computing device and to wake it from the reduced power mode if the particular computing device is in the reduced power mode so the communications can continue. In one implementation, various settings, such as one or more policies, allow the particular device to indicate when it should be awakened and when it should not be awakened.

FIG. 1 is a diagrammatic view of a computer system 10 using such a centralized wake service 14 of one implementation. One or more wake servers 12 host the centralized wake service 14. The term "server" as used herein is meant to broadly include computer servers, routers, and/or other components present in a network infrastructure that could provide a service to other computers and/or components on a network. Various network applications 16, such as email, voice-over-IP, instant messaging, and so on are able to communicate with the wake service 14 over a network 18, such as the Internet. One or more computing devices 20 are able to communicate with the wake service 14 over the network 18. When one of the network services 16 wishes to communicate with computing device 20 even when it is in a reduced power mode, the particular network service 16 can contact the wake service 14 for assistance.

Figure 2:
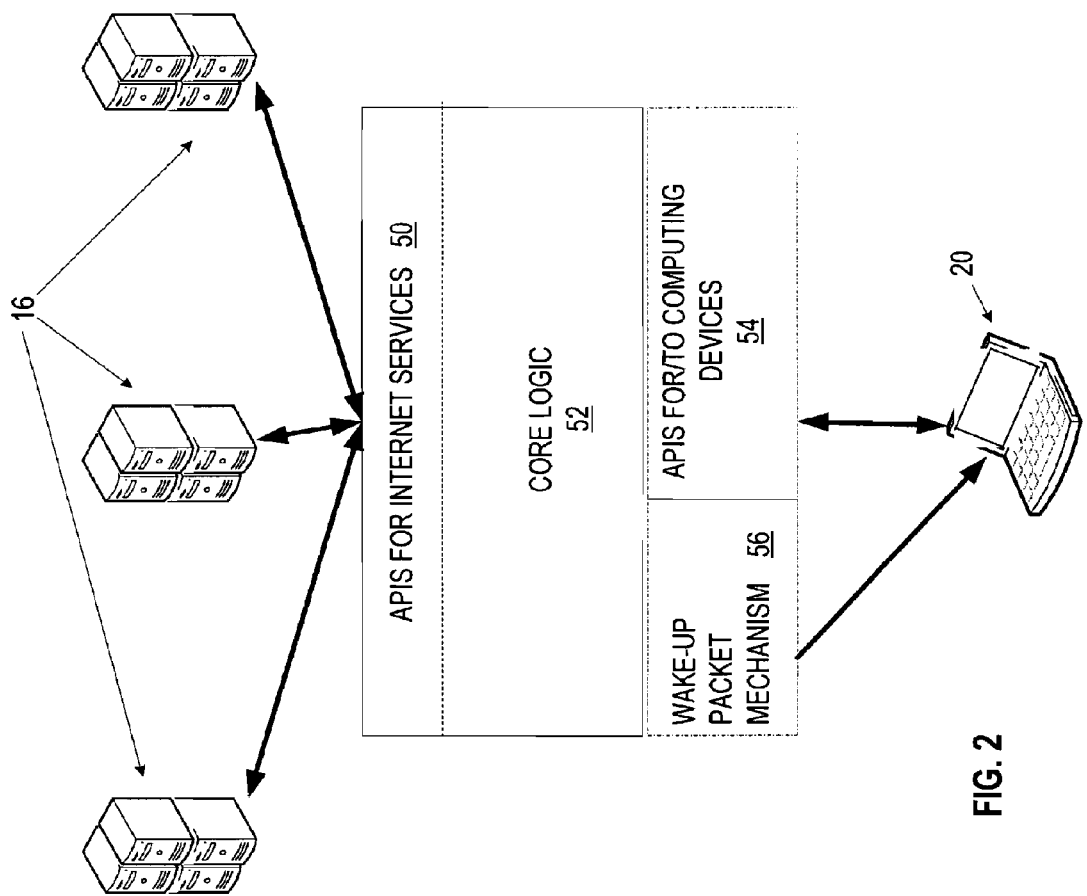
FIG. 2 is a diagram of one implementation that illustrates how some of the physical components of the computer system of FIG. 1 correlate to particular logical components.

Turning now to FIG. 2, a diagram of one implementation illustrates how some of the physical components of the computer system of FIG. 1 correlate to particular logical components. For example, the network applications 16 communicate with application programming interfaces for internet services 50 in order to utilize the wake service 14 of wake server 12. The particular computing device 20 communicates with application programming interfaces for and/or to computing devices, such as the client-side communication application 200 as described in FIG. 3. In one implementation, the core logic 52 and wake-up packet mechanism 56 are contained in the server-side wake service 14, such as the server-side wake application 230 described in FIG. 4. The wake-up packet mechanism 56 communicates with the particular computing device 20 to wake it from a reduced power mode when desired.

Figure 3:
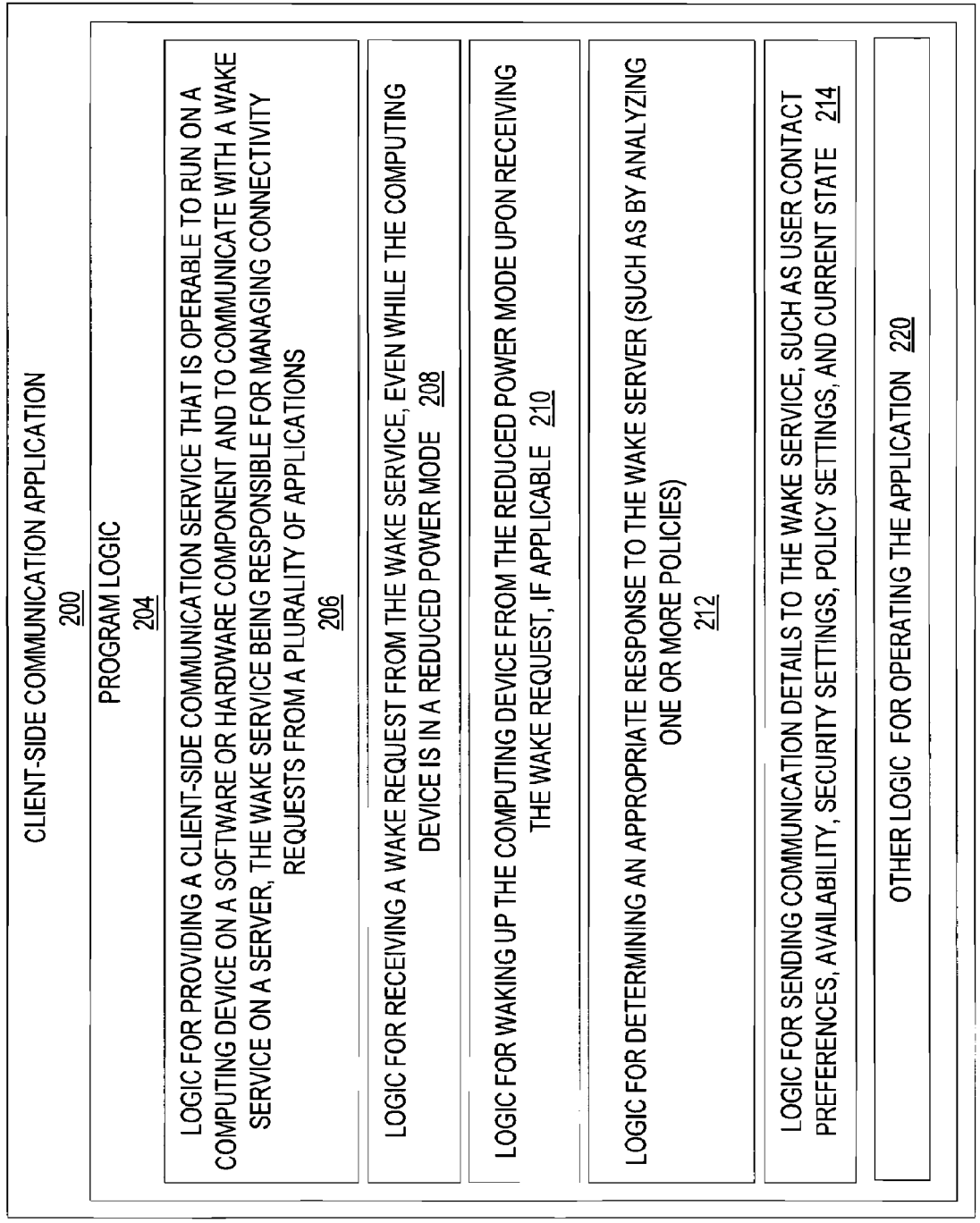
FIG. 3 is a diagrammatic view of client-side communication application of one implementation operating on the computer system of FIG. 1.

Turning now to FIG. 3, client-side communication application 200 operating on computing device 600 (of FIG. 8) is illustrated. In one implementation, client-side communication application 200 is one of the application programs that reside on computing device 600 (of FIG. 8). However, it will be understood that client-side communication application 200 can alternatively or additionally be embodied as computer-executable instructions on one or more computers and/or in different variations than shown on FIG. 8. Alternatively or additionally, one or more parts of client-side communication application 200 can be part of system memory 604 (on FIG. 8), on other computers and/or applications 615 (on FIG. 8), or other such variations as would occur to one in the computer software art.

Client-side communication application 200 includes program logic 204, which is responsible for carrying out some or all of the techniques described herein. Program logic 204 includes logic for providing a client-side communication service that is operable to run on a computing device on a software or hardware component and to communicate with a wake service on a server, the wake service being responsible for managing connectivity requests from a plurality of applications 206; logic for receiving a wake request from the wake service, even while the computing device is in a reduced power mode (which may be located in hardware, firmware, and/or software, etc.) 208; logic for waking up the computing device from the reduced power mode upon receiving the wake request, if applicable 210; logic for determining an appropriate response to the wake server (such as by analyzing one or more policies) 212; logic for sending communication details to the wake service, such as user contact preferences, availability, security settings, policy settings, and current state 214; and other logic for operating the application 220. In one implementation, program logic 204 is operable to be called programmatically from another program, such as using a single call to a procedure in program logic 204.

Figure 4:
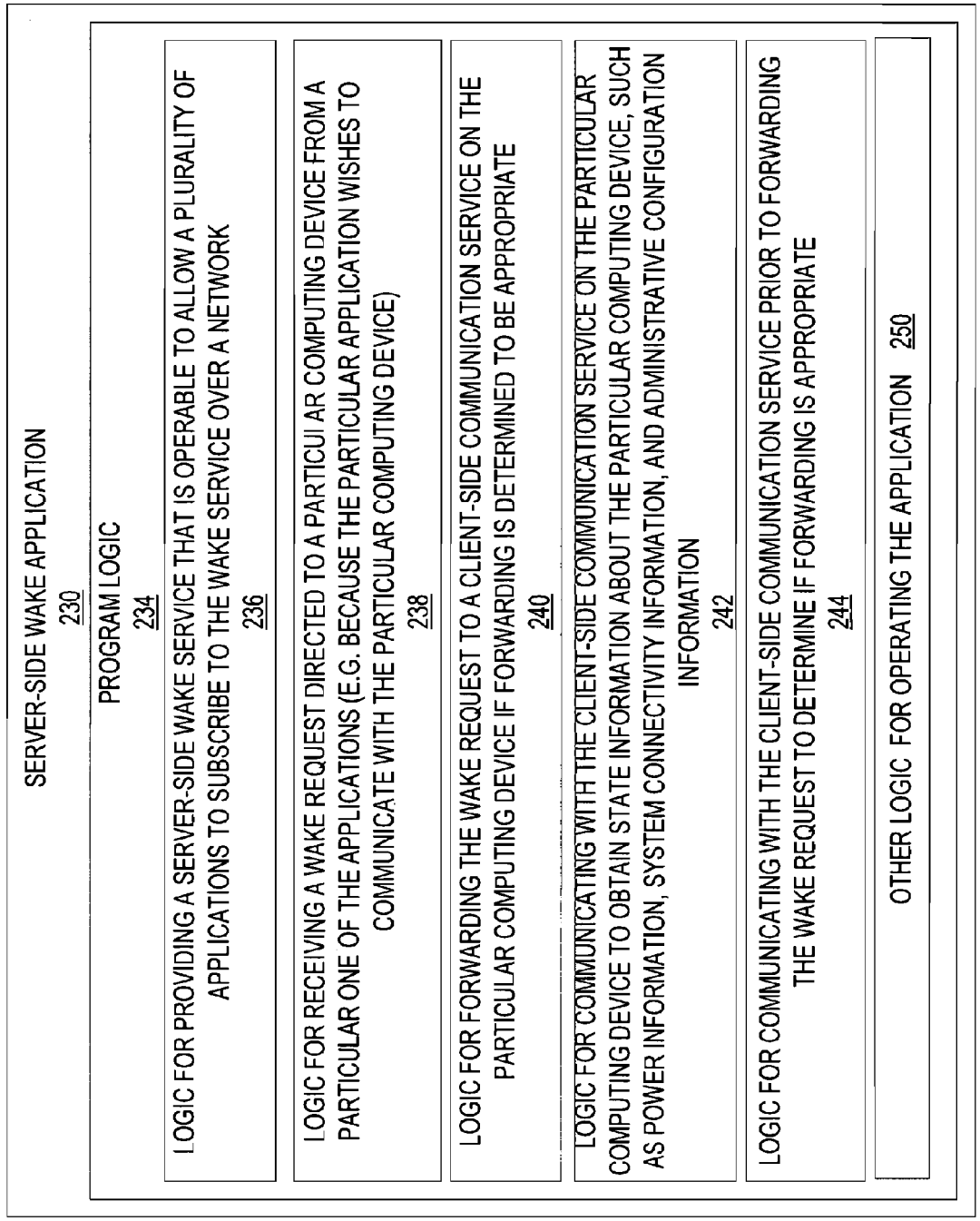
FIG. 4 is a diagrammatic view of server-side wake application of one implementation operating on the computer system of FIG. 1.

Turning now to FIG. 4, server-side wake application 230 operating on computing device 600 (of FIG. 8) is illustrated. In one implementation, client-side communication application 200 is one of the application programs that reside on computing device 600 (of FIG. 8). However, it will be understood that server-side wake application 230 can alternatively or additionally be embodied as computer-executable instructions on one or more computers and/or in different variations than shown on FIG. 8. Alternatively or additionally, one or more parts of server-side wake application 230 can be part of system memory 604 (on FIG. 8), on other computers and/or applications 615 (on FIG. 8), or other such variations as would occur to one in the computer software art.

Server-side wake application 230 includes program logic 234, which is responsible for carrying out some or all of the techniques described herein. Program logic 234 includes logic for providing a server-side wake service that is operable to allow a plurality of applications to subscribe to the wake service over a network 236; logic for receiving a wake request directed to a particular computing device from a particular one of the applications (e.g. because the particular application wishes to communicate with the particular computing device) 238; logic for forwarding the wake request to a client-side communication service on the particular computing device if forwarding is determined to be appropriate 240; logic for communicating with the client-side communication service on the particular computing device to obtain state information about the particular computing device, such as power information, system connectivity information, and administrative configuration information 242; logic for communicating with the client-side communication service prior to forwarding the wake request to determine if forwarding is appropriate 244; and other logic for operating the application 250. In one implementation, program logic 234 is operable to be called programmatically from another program, such as using a single call to a procedure in program logic 234.

Figure 5:
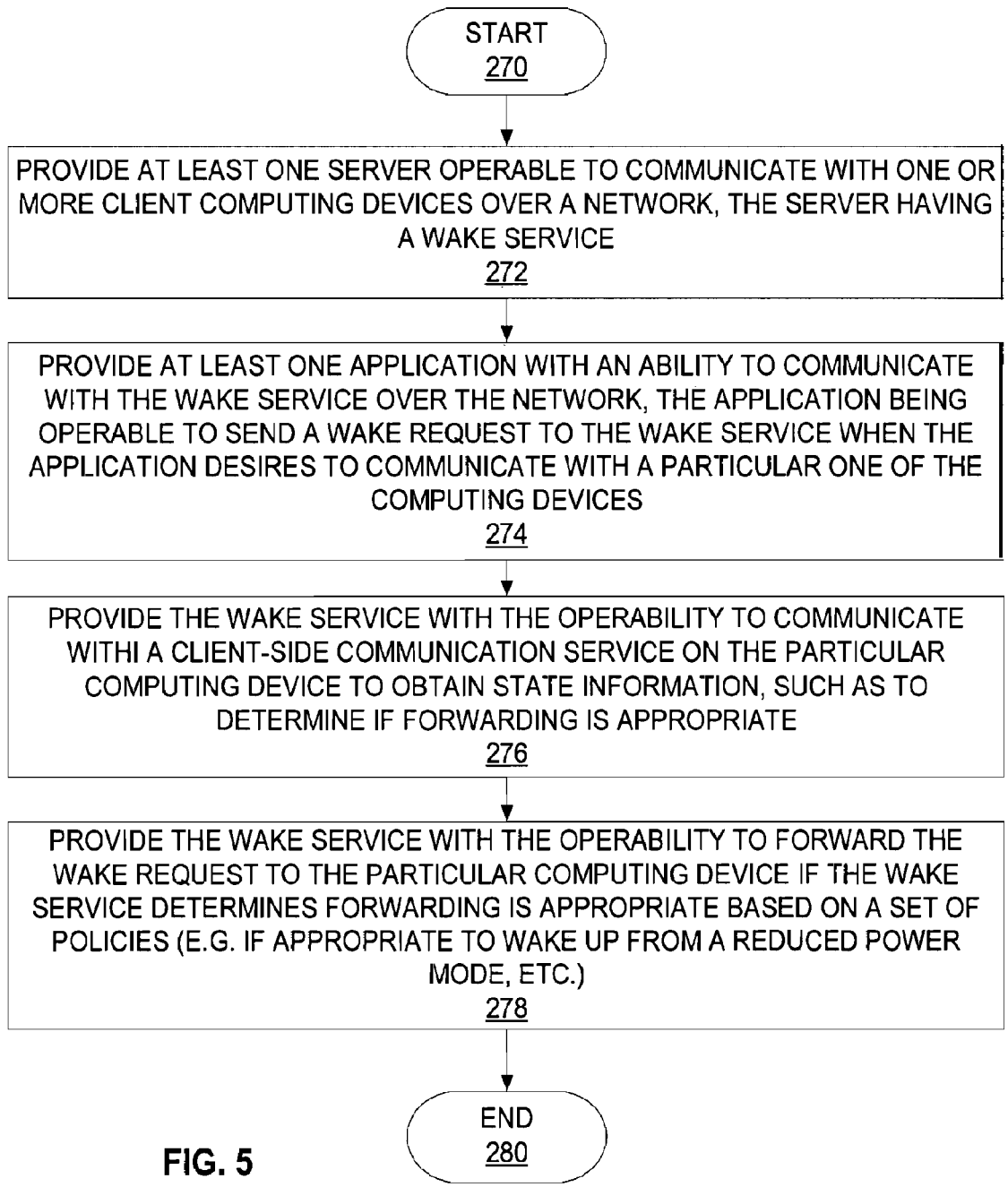
FIG. 5 is a high-level process flow diagram for one implementation of the system of FIG. 1.
Figure 6:
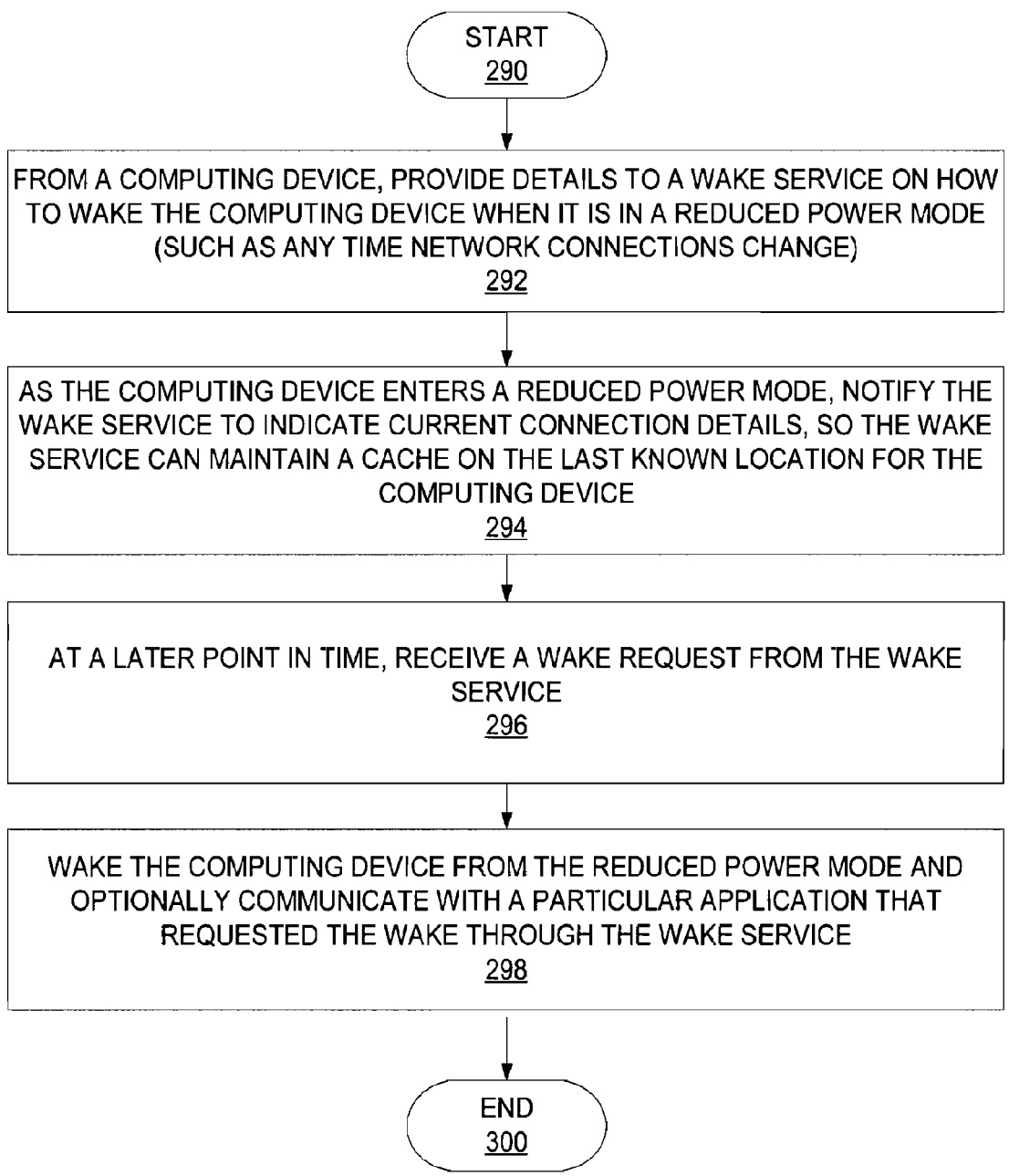
FIG. 6 is a process flow diagram for one implementation of the system of FIG. 1 illustrating the stages involved in providing a client-side communication service.
Figure 7:
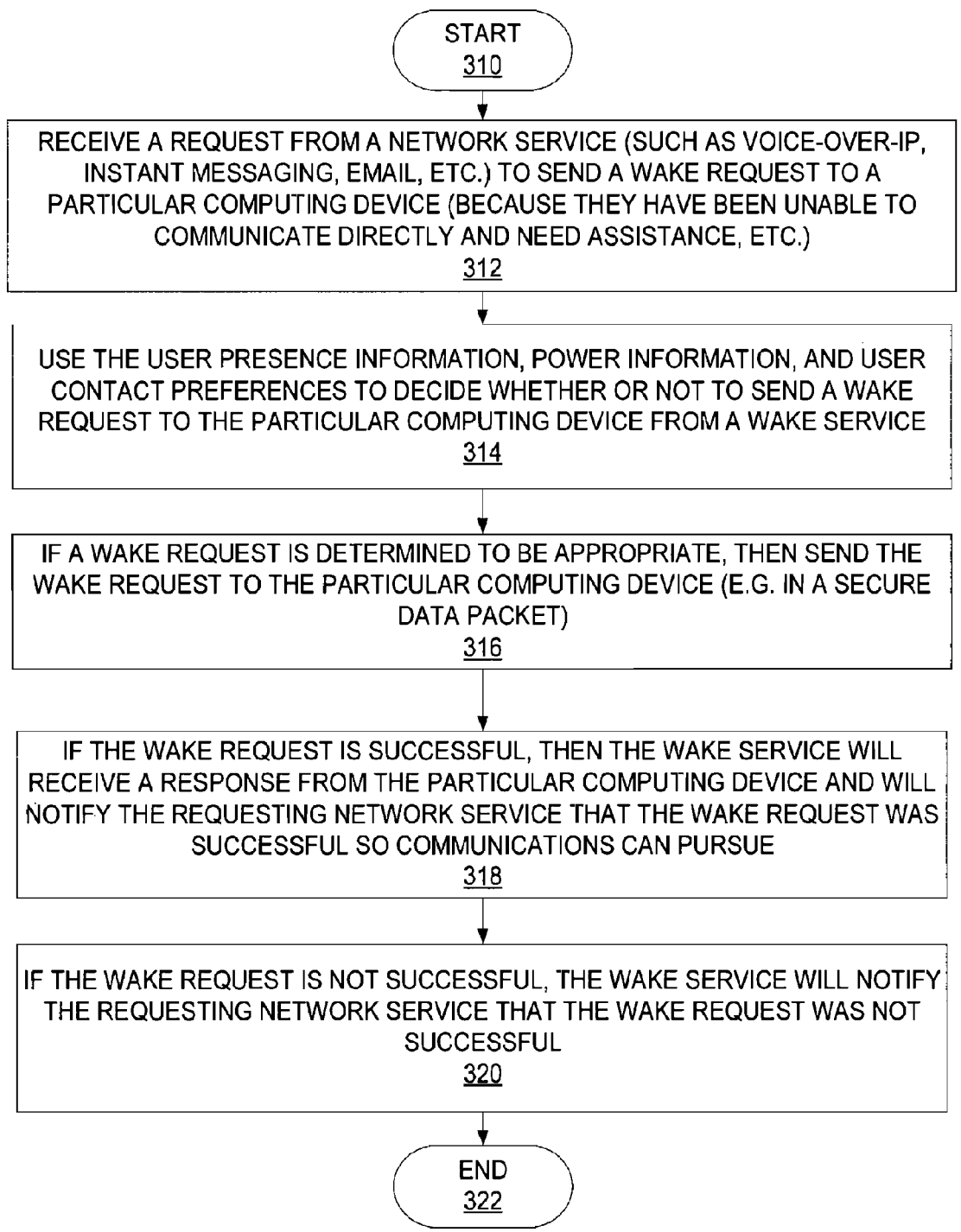
FIG. 7 is a process flow diagram for one implementation of the system of FIG. 1 illustrating the stages involved in providing a server-side wake service.

Turning now to FIGS. 5-7 with continued reference to FIGS. 1-2, the stages for implementing one or more implementations of client-side communication application 200 and/or server-side wake application 230 are described in further detail. FIG. 5 is a high level process flow diagram for system 10. In one form, the process of FIG. 5 is at least partially implemented in the operating logic of computing device 600 (of FIG. 8). The process begins at start point 270 with providing at least one server operable to communicate with one or more client computing devices over a network, the server having a wake service (stage 272). At least one application is provided with an ability to communicate with the wake service over the network, the application being operable to send a wake request to the wake service when the application desires to communicate with a particular one of the computing devices (stage 274).

The wake service is provided with the operability to communicate with a client-side communication service on the particular computing device to obtain state information, such as to determine if forwarding of the wake request is appropriate (stage 276). The wake service is provided with the operability to forward the wake request to the particular computing device if the wake service determines forwarding is appropriate based on a set of policies (stage 278). As a few non-limiting examples, the set of policies may help the wake service determine if it is appropriate to wake up the computing device from a reduced power mode, if the computing device is not in reduced power mode and is ready for communications, etc.) (stage 278). The process ends at end point 280.

FIG. 6 illustrates one implementation of the stages involved in providing a client-side communication service. In one form, the process of FIG. 6 is at least partially implemented in the operating logic of computing device 600 (of FIG. 8). The process begins at start point 290 with providing details from a computing device to a wake service on how to wake the computing device when it is in a reduced power mode (such as any time network connections change) (stage 292). As the computing device enters a reduced power mode, the client-side communication application on the computing device notifies the wake service to indicate current connection details (stage 294). The wake service can maintain a cache on the last known location for the computing device using these connection details (stage 294). At a later point in time, a wake request is received by the client-side communication application from the wake service (stage 296). The computing device is awakened from the reduced power mode and optionally communicates with a particular application that requested the wake through the wake service (stage 298). The process ends at end point 300.

FIG. 7 illustrates one implementation of the stages involved in providing a server-side wake service. In one form, the process of FIG. 7 is at least partially implemented in the operating logic of computing device 600 (of FIG. 8). The process begins at start point 310 with receiving a request from a network service (such as voice-over-IP, instant messaging, email, etc.) to send a wake request to a particular computing device (because they have been unable to communicate directly and need assistance, etc.) (stage 312). The user presence information, power information, and user contact preferences are used to decide whether or not to send a wake request to the particular computing device from a wake service (stage 314). If a wake request is determined to be appropriate, then the server-side wake service sends the wake request to the particular computing device (e.g. in a secure data packet) (stage 316). If the wake request is successful, then the wake service will receive a response from the particular computing device and will notify the requesting network service that the wake request was successful so communications can pursue (stage 318). If the wake request is not successful, the wake service will notify the requesting network service that the wake request was not successful (stage 320). The process ends at end point 322.

Figure 8:
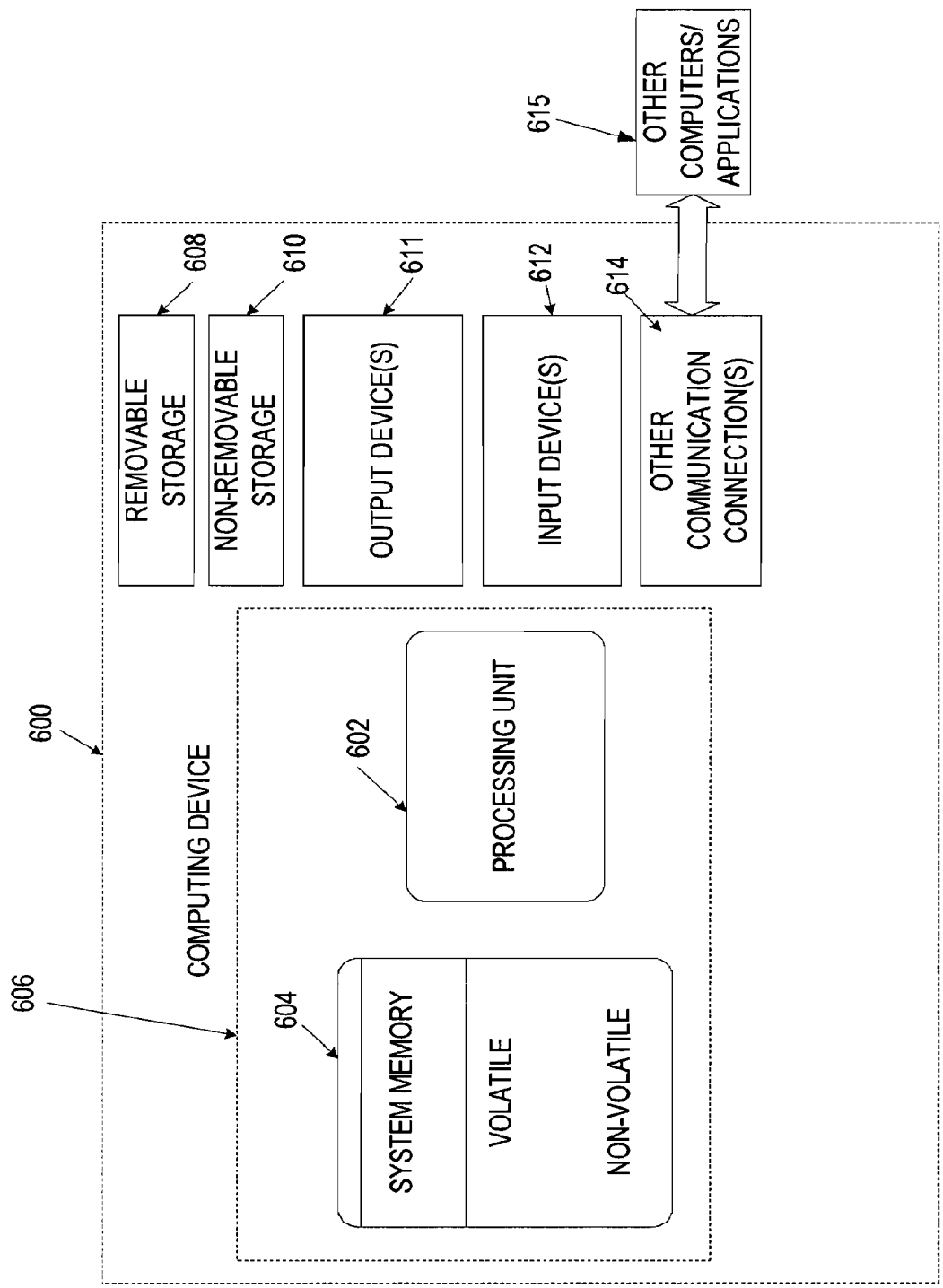
FIG. 8 is a diagrammatic view of a computer system of one implementation.

As shown in FIG. 8, an exemplary computer system to use for implementing one or more parts of the system includes a computing device, such as computing device 600. In its most basic configuration, computing device 600 typically includes at least one processing unit 602 and memory 604. Depending on the exact configuration and type of computing device, memory 604 may be volatile (such as RAM), non-volatile (such as ROM, flash memory, etc.) or some combination of the two. This most basic configuration is illustrated in FIG. 8 by dashed line 606.

Additionally, device 600 may also have additional features/functionality. For example, device 600 may also include additional storage (removable and/or non-removable) including, but not limited to, magnetic or optical disks or tape. Such additional storage is illustrated in FIG. 8 by removable storage 608 and non-removable storage 610. Computer storage media includes volatile and nonvolatile, removable and non-removable media implemented in any method or technology for storage of information such as computer readable instructions, data structures, program modules or other data. Memory 604, removable storage 608 and non-removable storage 610 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by device 600. Any such computer storage media may be part of device 600.

Computing device 600 includes one or more communication connections 614 that allow computing device 600 to communicate with other computers/applications 615. Device 600 may also have input device(s) 612 such as keyboard, mouse, pen, voice input device, touch input device, etc. Output device(s) 611 such as a display, speakers, printer, etc. may also be included. These devices are well known in the art and need not be discussed at length here. In one implementation, computing device 600 includes client-side communication application 200 (of FIG. 3). In another implementation, computing device includes server-side wake application 230 (of FIG. 4).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the client and/or server arrangements, user interface screen content, and/or data layouts as described in the examples discussed herein could be organized differently on one or more computers to include fewer or additional options or features than as portrayed in the examples.

What is claimed is:

1. A computing device comprising:
at least one memory and at least one processor that are respectively configured to store and execute instructions, including instructions for performing operations, the operations including:
providing a communication service that transmits details, via the Internet, to a remote computing device of a plurality of remote computing devices, the details including an indication of how to communicate a wake request to the computing device via the Internet to wake the computing device from the reduced power mode and an indication of conditions for which the wake request is to be communicated to the computing device;
receiving the wake request, via the Internet, when the computing device is operating in the reduced power mode, the wake request originating from a network application executing in at least one of the plurality of remote computing devices;
waking the computing device from the reduced power mode in response to the received wake request; and
determining an appropriate response to the received wake request based on analyzing one or more policies.

2. The computing device of claim 1, wherein the operations further comprise:
sending a notification indicating current connection details as the computing device enters the reduced power mode.

3. The computing device of claim 1, wherein the operations further comprise:
sending the appropriate response, after successfully waking from the reduced power mode in response to receiving the wake request and determining the appropriate response.

4. The computing device of claim 1, wherein the details regarding how to wake the computing device when the computing device is in a reduced power mode include at least one of user contact preferences, availability information, security settings, policy settings, or current state information.

5. The computing device of claim 1, wherein the operations further comprise:
providing state information in response to receiving a communication for obtaining the state information.

6. The computing device of claim 5, wherein the state information includes power settings.

7. The computing device of claim 5, wherein the state information includes user administrative configuration information.

8. The computing device of claim 5, wherein the state information includes system connectivity information.

9. A computing device comprising:
   means for providing details to a remote second computing device, via a wide area network ("WAN") having a plurality of remote second computing devices connected thereto, regarding how to communicate a wake request to the computing device via the WAN to wake the computing device from a reduced power mode, the details including one or more policies indicating when the computing device is to be awakened and when the computing device is not to be awakened;
   means for receiving the wake request, via the WAN, and waking the computing device when the computing device is operating in the reduced power mode, the wake request originating from a network application executing in at least one of the plurality of remote second computing devices; and
   means for determining an appropriate response to the received wake request based on analyzing the one or more policies.

10. The computing device of claim 9, further comprising:
   means for sending a notification indicating current connection details as the computing device enters the reduced power mode.

11. The computing device of claim 9, further comprising:
   means for sending the appropriate response, after successfully waking from the reduced power mode in response to receiving the wake request.

12. The computing device of claim 9, wherein the details regarding how to wake the computing device when the computing device is operating in the reduced power mode include user contact preferences.

13. The computing device of claim 9, wherein the details regarding how to wake the computing device when the computing device is operating in the reduced power mode include availability information.

14. The computing device of claim 9, wherein the details regarding how to wake the computing device when the computing device is operating in the reduced power mode include current state information.

15. The computing device of claim 14, wherein the current state information includes user administrative configuration information.

16. The computing device of claim 14, wherein the current state information includes system connectivity information.

17. A machine-implemented method comprising:
   providing, by a communication service on a computing device, details to a remote computing device, via a wide area network ("WAN") having a plurality of remote computing devices connected thereto, the details including an indication of how to communicate a wake request to the computing device via the WAN to wake the computing device from a reduced power mode and an indication of conditions for which the wake request is to be communicated to the computing device;
   receiving, by the computing device, the wake request via the WAN when the computing device is operating in the reduced power mode, the wake request originating from a network application executing in at least one of the plurality of remote computing devices; and
   determining, by the computing device, an appropriate response to the received wake request upon receiving the wake request.

18. The machine-implemented method of claim 17, further comprising
   waking the computing device from the reduced power mode upon receiving of the wake request.

19. The machine-implemented method of claim 18, further comprising
   sending, by the computing device, the appropriate response, after successfully waking from the reduced power mode in response to receiving the wake request and determining the appropriate response.

20. The machine-implemented method of claim 17, further comprising
   providing, by the computing device, state information in response to receiving a communication for obtaining the state information.

* * * * *